J. M. STANDLEY.
LAND LEVELER.
APPLICATION FILED JULY 14, 1916.
1,239,058.
Patented Sept. 4, 1917.
2 SHEETS—SHEET 1.
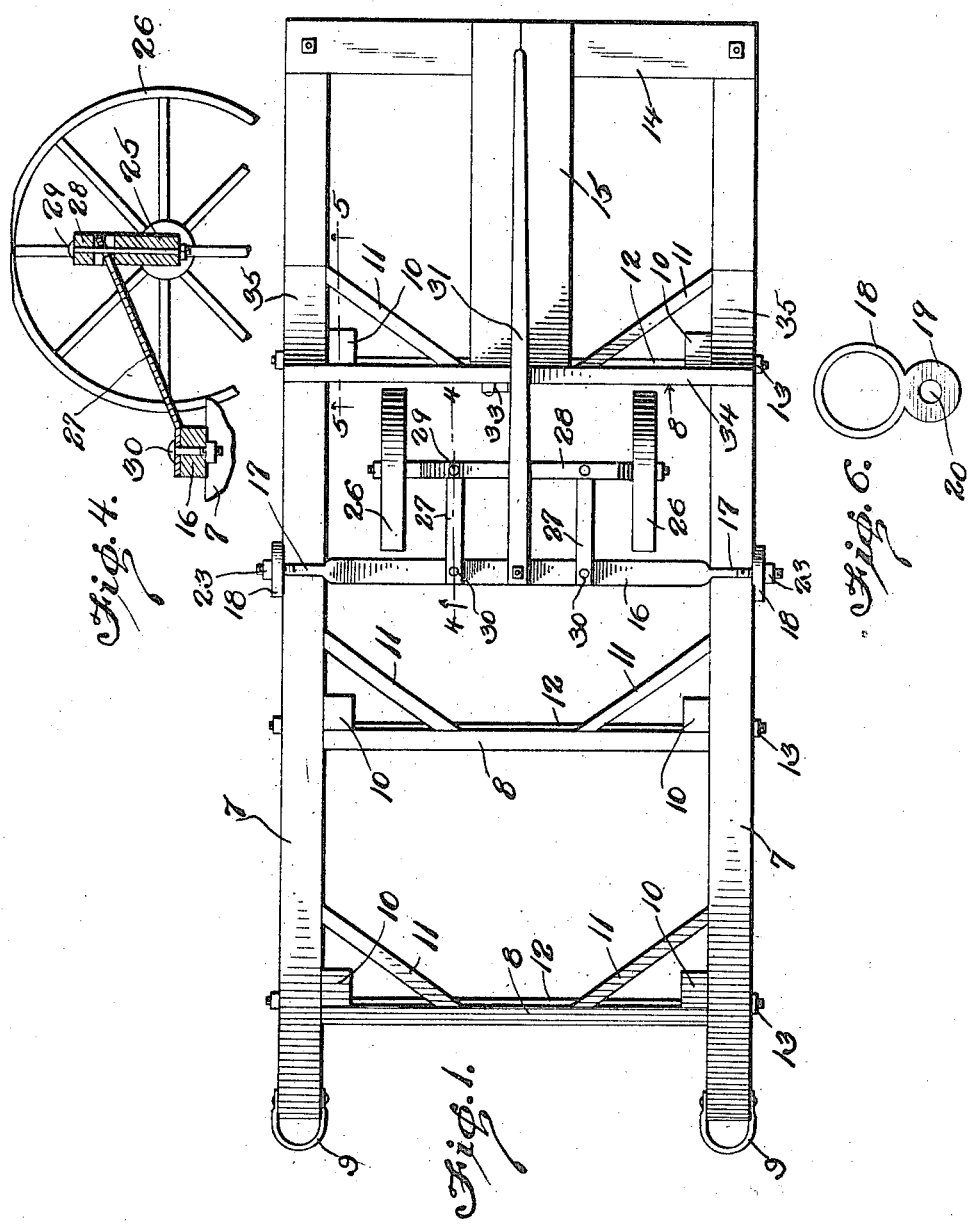
WITNESSES
Howard F Costello
L. R. Galt.
INVENTOR
John M. Standley
BY Richard B. Owen.
ATTORNEY

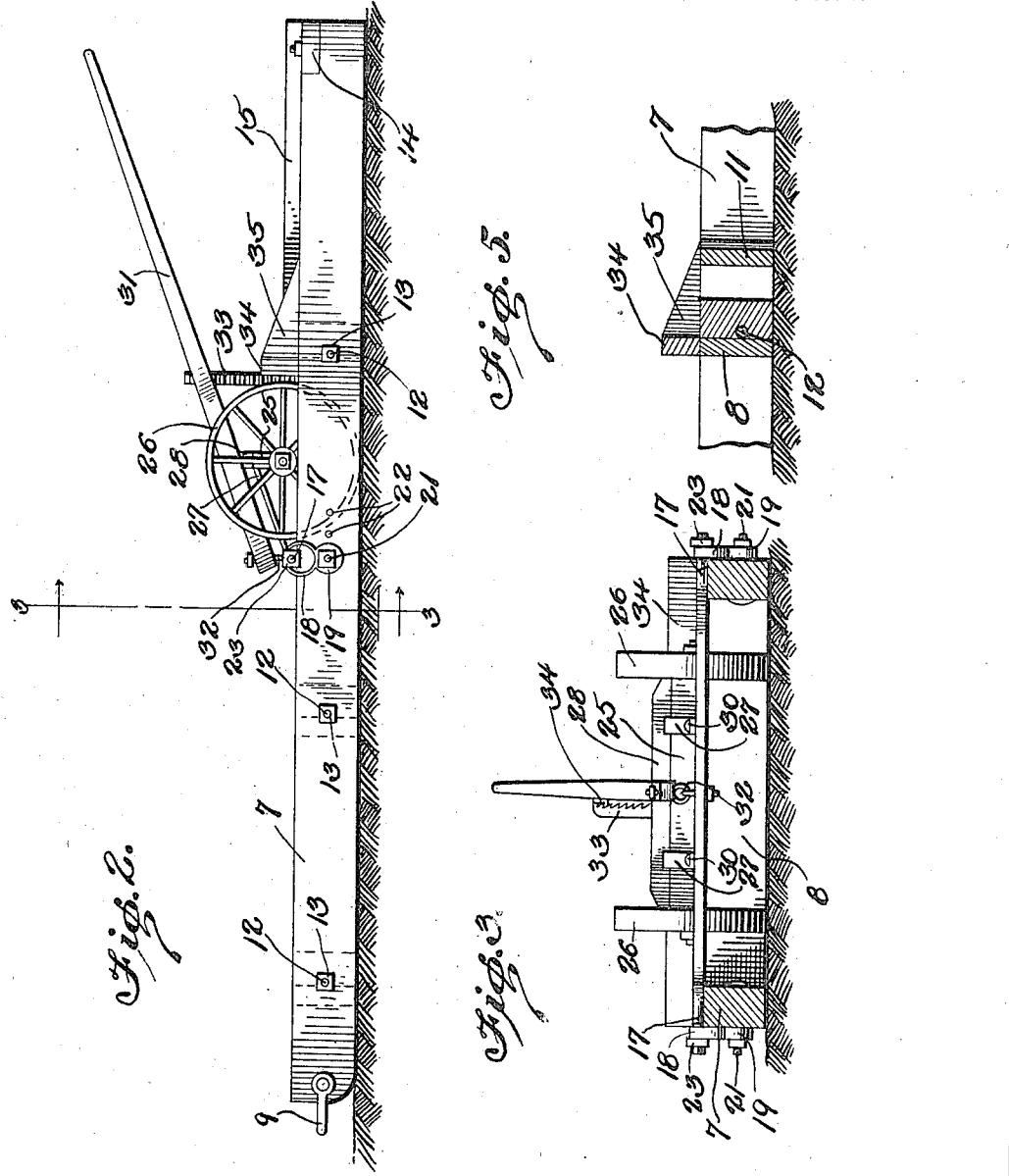

UNITED STATES PATENT OFFICE.

JOHN M. STANDLEY, OF LOGAN, UTAH.

LAND-LEVELER.

1,239,058.

Specification of Letters Patent.  Patented Sept. 4, 1917.

Application filed July 14, 1916.  Serial No. 109,372.

*To all whom it may concern:*

Be it known that I, JOHN M. STANDLEY, a citizen of the United States, residing at Logan, in the county of Cache and State of Utah, have invented certain new and useful Improvements in Land-Levelers, of which the following is a specification.

This invention relates to land levelers, and has for its primary object to generally improve and increase the efficiency and practicability of devices of this character.

A further object of the invention is to provide a land leveler which shall be of simple and inexpensive construction, and which is equipped with improved means for enabling the leveler to be raised from the ground surface to the desired degree.

A still further object of the invention is to provide a land leveler which is so constructed as to be capable of manipulation by a single person.

With these particular objects in view together with others which will appear as the description proceeds, the invention resides in the novel formation and arrangement of parts, all as will be described more fully hereinafter, illustrated in the drawings, and particularly pointed out in the appended claims.

The invention will be best understood by reference to the accompanying drawings, wherein:—

Figure 1 is a top plan view of a leveler constructed and arranged in accordance with my invention;

Fig. 2 is a side elevation of the device;

Fig. 3 is a sectional view taken upon the line 3—3 of Fig. 2;

Fig. 4 is a sectional view taken upon the line 4—4 of Fig. 1;

Fig. 5 is a detail fragmentary section taken on the line 5—5 of Fig. 1; and

Fig. 6 is a detail view of one of the shaft coupling members.

In detail:

Referring now more particularly to the drawings, 7 indicates the side members or beams of a scraper frame, the same being parallelly arranged and connected at various points in their length by transversely disposed scraper or leveler beams 8. The forward ends of the side bars 7 are equipped with clevices 9, through the medium of which draft animals may be attached to the device to draw the same. The scraper or leveling beams 8 are preferably of a width equal to the thickness of the side bars 7, and are secured at their extremities to blocks 10 upon the rear faces of the side bars. Brace beams 11 are also arranged between the said side bars and scraper beams to assist in holding the latter rigid. Bars 12 extend from the side members 7 in arrears of the scraper beams 8, nuts 13 being arranged upon the extremities of the said bars to bind the side members 7 tightly upon the scraper beams and to assist in maintaining the said beams in proper position. The rearmost ends of the side bars 7 are connected to a beam 14. The beam 14 supports one end of the platform 15, the opposite end being secured upon the next adjacent scraper beam 8, the arrangement offering a suitable support upon which the operator may stand. From this construction it is apparent that a durable leveler has been provided, and upon drawing the same over the ground the uneven surfaces therein will be scraped and leveled by the spaced leveling beams 8.

A transversely disposed shaft 16 is arranged preferably midway the forward and rear ends of the side members 7, the said beam being enlarged or widened throughout the major portion of its length, and has its ends reduced to provide trunnions 17 for engagement through suitable retaining loops 18 secured to the side members 7. These loops have pendant securing portions, the same being provided with apertures 20, through which the bolts 21 are adapted to extend to retain the loops 18 upon the side beams 7. In order that these retaining loops may be disposed longitudinally of the side beams, the latter are provided with spaced portions 22 for the reception of the bolts 21. The trunnion portions 17 of the beam 16 are threaded as shown, and nuts 23 are arranged on said ends to retain the same within the retaining loops 18 upon the opposite frame members 7. It will thus be seen that the beam or shaft 16 is held firmly against movement longitudinally of the frame, and yet is capable of rotation thereon.

Associated with a frame of this character is a truck. This truck comprises an axle 25 disposed in arrears of and parallel with the shaft 16, the said axle being substantially shorter than the distance between the side beam 7, and has wheels 26 mounted for rotation upon the ends thereof. Links 27 connect the axle with the shaft 16, and these links may be of metal or any other preferred material, and extend within apertures formed by notching or cutting away the under face of the beam 28. The beam is mounted upon the axle, and bolts 29 are passed through the said beam, link ends and axle to retain said beam upon the axle, and to house the link ends within the apertures formed between the said beam and axle. The forward extremities of the links 27 may be bolted to the shaft 16, as shown at 30. The truck thus constructed is arranged between the side members 7 in such manner that the wheels will be disposed at equal distances from the side members. It will also be observed that the wheels 26 are of such diameter that the axle 25 supporting the same will be normally disposed above the upper edges of the scraper frame. A lever 31 is connected at its forward ends as by the looped members 32 with the axle 16 at a point intermediate the ends of the latter. This beam extends rearwardly from its point of connection with the shaft, and rests upon the axle 25 of the truck, the said beam being of such length as to extend above the platform 15 on the frame. A rack member 33 is secured adjacent the platform 15 and in close proximity to the lever 31, the said rack 33 being adapted to be engaged by a lug 34 projecting from the said lever to maintain the latter in different degrees of adjustment. It is obvious from this construction that downward pressure applied to the rearmost end of the lever 31 creates lifting action upon the shaft 16 and the scraper frame to which the same is secured. The axle 25 of the truck 26 forms a fulcrum for the lever 31, and the latter may be held in its various degrees of adjustment by the rack member 33. It is thus seen that the frame carrying the scraper beams, may, when desired, be lifted from the ground, the rear wheels 26 supporting the same in lifted position. The axle 16 to which the truck is attached, may, through the adjustable feature of the retaining loops 18, be advanced or retracted upon the frame when desired.

A supplementary scraper beam 34 may, if desired, be arranged upon the rearmost of the scraper beams 8 to project above the upper surface of the side beam 7. Supporting blocks 35 are secured upon the said side members to hold the beams 34 against rearward movement. This supplemental beam enables the leveler to accommodate a greater quantity of earth during the scraping or leveling operation.

While the above is a description of the preferred embodiment of the invention, it is obvious that various changes may be made in the minor details of construction and arrangement of parts, without departing from the spirit of the invention, or exceeding the scope of the claims.

I claim:

1. In a device of the class described, a scraper frame, retaining loops adjustably mounted upon said frame, a shaft journaled at its ends in said loops, a truck carried by said shaft, and a lever connected at one end on said shaft and resting upon the axle of said truck, substantially as described.

2. In a device of the class described, a scraper frame, a shaft secured to and extending transversely of said frame, an axle, a beam on said axle, the said beam and axle being cut away to provide openings, links extending at one end into said openings, bolts connecting said beam, axle and link ends, the opposite ends of said links being secured to said shaft, and a lever secured to said shaft and resting upon said axle, substantially as described.

3. In a device of the class described, a scraper frame, retaining loops, a side member on said frame being provided with spaced apertures, bolts for insertion through said apertures and for retaining said loops, a shaft mounted at its extremities for rotation in said loops, a truck connected to said shaft, and a lever secured to said shaft and resting upon the axle of said truck, substantially as described.

4. In a device of the class described, a pair of side members, scraper beams connecting the side members and arranged in spaced relation therebetween, bolts connecting said side members in the rear of said beams, a truck arranged midway of the front and rear ends of said side members, means for moving said side members relative to said truck, and a supplementary scraper beam in the rear of said truck and extending above said side members, substantially as described.

In testimony whereof I affix my signature in presence of two witnesses.

JOHN M. STANDLEY.

Witnesses:
 FRED W. RICHARDS,
 LOUIS B. CARDON.